Patented Sept. 1, 1953

2,650,936

UNITED STATES PATENT OFFICE 2,650,936

PREPARATION OF HYDROXY-CARBOXYLIC ACIDS

Hans Schmidt, Wuppertal-Vohwinkel, Germany, assignor, by mesne assignments, to Schenley Laboratories, Inc., New York, N. Y., a corporation of Delaware No Drawing. Original application November 17, 1949, Serial No. 128,024. Divided and this application October 10, 1951, Serial No. 250,793. In Germany October 20, 1948

4 Claims. (Cl. 260—528)

This invention relates to the production of polyhydroxymonocarboxylic acids and more particularly to a catalytic process for the oxidation of sugars. This application is a division of my copending application, Serial No. 128,024, filed November 17, 1949, entitled "Hydroxy-Carboxylic Acids."

It is known that the oxidation of reducing sugars with oxygen or air in an alkaline solution can be carried out in such a manner that a polyhydroxymonocarboxylic acid having one less carbon atom, is obtained as the chief reaction product. For this purpose, oxygen or air in very finely distributed form is caused to react upon the monosaccharides in an alkaline solution.

Since the yield obtained according to the above process is unsatisfactory I have made efforts to influence the reaction by adding catalysts. Although the usual catalysts, e. g. metals, partly accelerate the oxidation process they have proved not to promote the formation of polyhydroxymonocarboxylic acids but to influence the oxidation in a different direction.

I have now found that certain organic compounds, particularly simple mononuclear aromatic nitro- and nitroso-compounds, definitely promote the formation of polyhydroxymonocarboxylic acids, increasing the yield of these acids and reducing the formation of by-products. The addition of small amounts of such substances suffices to catalyze the oxidation reaction in a manner such as to achieve substantial increases in the yield.

The following example serves to illustrate the action of the catalysts of this invention:

About 150 grams of saccharose are dissolved in 1200 cc. of water, and the solution so obtained is inverted after the addition of some hydrochloric acid. This solution, together with the oxidation catalyst as hereinafter specified, is filled into a vertical glass tube of 75 mm. diameter and oxygen, in a vigorous current is introduced through a clay filter candle at the base of the tube. From a dropping funnel mounted at the top of the tube, a solution of 147.5 grams of caustic potash in 950 cc. of water is added dropwise over a 2 hour period. The temperature of the reaction mixture rises spontaneously and then is kept at 40–42° C. while oxygen is passed through for another 2 hours, followed by air for a further 4 hours. The progress of the oxidation can be tested, for instance, by titration. After completion of the oxidation, the solution is neutralized with glacial acetic acid and reduced to a small volume in vacuo. The potassium arabonate formed crystallizes and a further crop is obtained when methanol may be added. The reaction product is isolated, washed with methanol, and dried.

The following table gives a summary of the yields obtained in accordance with this invention while using different catalytically active substances.

In order to complete the comparative tests according to the above schedule some of the experiments listed in the following table were carried out with air exclusively and some others with oxygen exclusively.

| No. | Catalyst | Quantity of the catalyst used | Time of introducing— | | Yield of arabonate of potassium in grms. (theory 180 grams) |
|---|---|---|---|---|---|
| | | | oxygen | air | |
| | | | Hours | Hours | |
| 1 | Control | φ | 9 | | 117.5 |
| 2 | do | φ | 4 | 4 | 117 |
| 3 | do | φ | | 8 | 96 |
| 4 | Nitrobenzene | 1 cc | 4 | 4 | 127.5 |
| 5 | do | 3 cc | 4 | 4 | 136 |
| 6 | do | 10 cc | 4 | 4 | 136.7 |
| 7 | do | do | | 8 | 130 |
| 8 | Nitrosobenzene | 3 grams | 4 | 4 | 134.3 |
| 9 | p-Nitrobenzoic acid | do | 4 | 4 | 140.3 |
| 10 | m-Nitrobenzoic acid | do | 4 | 4 | 136 |
| 11 | o-Nitrobenzoic acid | do | 4 | 4 | 132.8 |
| 12 | o-Nitrophenol | do | 4 | 4 | 128 |

It is evident from the data of this table that, in accordance with my invention, the yield of polyhydroxymonocarboxylic acids is considerably increased. It will be understood that, in the process of this invention it is also possible to combine or use conjointly different catalysts of the group above mentioned. The efficiency of the catalyst is not only evident when using oxygen exclusively, or on subsequently completing the oxidation with air after initial use of oxygen, but also is evident when using air exclusively for the entire oxidation. This means a substantial economy in the oxygen required which is important when working on a technical scale, since a considerable part of the oxygen passes through unused. Without using catalysts, yields are obtained with air which are far below those obtained with oxygen or with oxygen and air (cf. tests 1, 2 and 3).

The melting points (with decomposition) of the products obtained according to the invention are between 215 and 220° C. On conversion into calcium arabonate, good yields are obtained. Only a slight amount of insoluble calcium salt (calcium oxalate) is formed, owing to the fact that the formation of by-products of the oxidation process is substantially reduced. Any residual catalytic material in the product which may not have been washed out with methanol can easily be removed, for instance, by treatment with animal charcoal.

For the purpose of comparison, the tests enumerated in the above table have been carried out in the same manner. However, it is also feasible to vary the operating conditions within a wide range, not only as to temperature, time, concentration etc., but also, for instance, as to the amount and kind of the alkali used.

Having thus described the subject matter of this invention, what it is desired to secure by Letters Patent is:

1. In a process for the production of aliphatic polyhydroxymonocarboxylic acids by oxidation of a reducing sugar with an oxygen-containing gas in an aqueous alkaline reaction medium, the improvement that comprises performing this oxidation while having present in the reaction medium, a catalytically effective amount of catalyst comprising a simple mononuclear aromatic compound having a nuclear substituent of the group consisting of nitro and nitroso.

2. A process as defined in claim 1 wherein the simple mononuclear aromatic compound is nitrobenzene.

3. A process as defined in claim 1 wherein the simple mononuclear aromatic compound is nitrosobenzene.

4. A process as defined in claim 1 wherein the simple mononuclear aromatic compound is nitrobenzoic acid.

HANS SCHMIDT.

References Cited in the file of this patent

FOREIGN PATENTS

| Number | Country | Date |
|--------|---------|------|
| 620,248 | Germany | Oct. 17, 1935 |